T. E. MURRAY.
VEHICLE WHEEL SECTION OF SHEET METAL.
APPLICATION FILED MAR. 28, 1918.
1,316,382.
Patented Sept. 16, 1919.
2 SHEETS—SHEET 1.
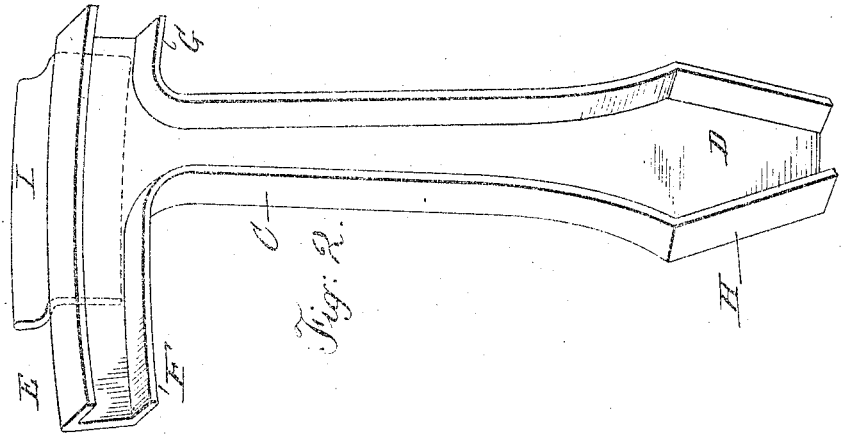
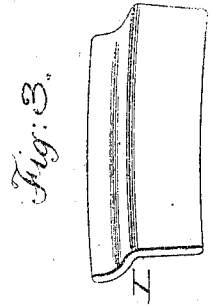
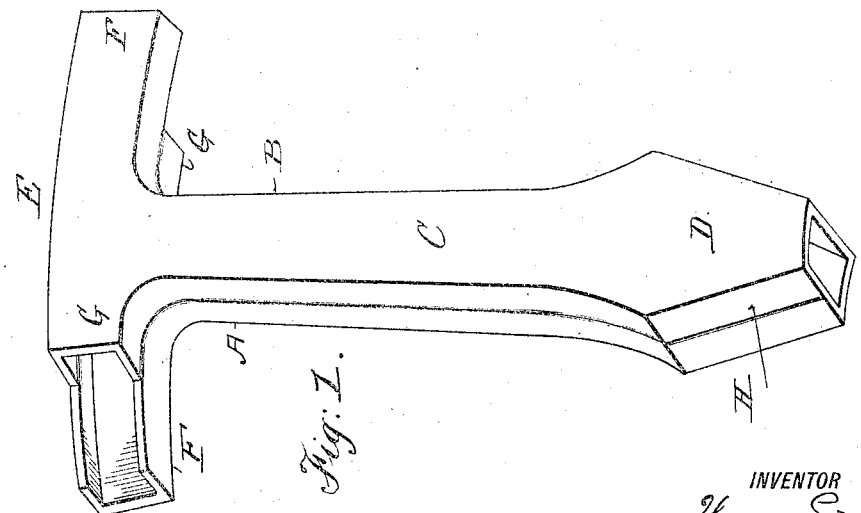
INVENTOR
Thomas E. Murray
BY Park Benjamin
his ATTORNEY

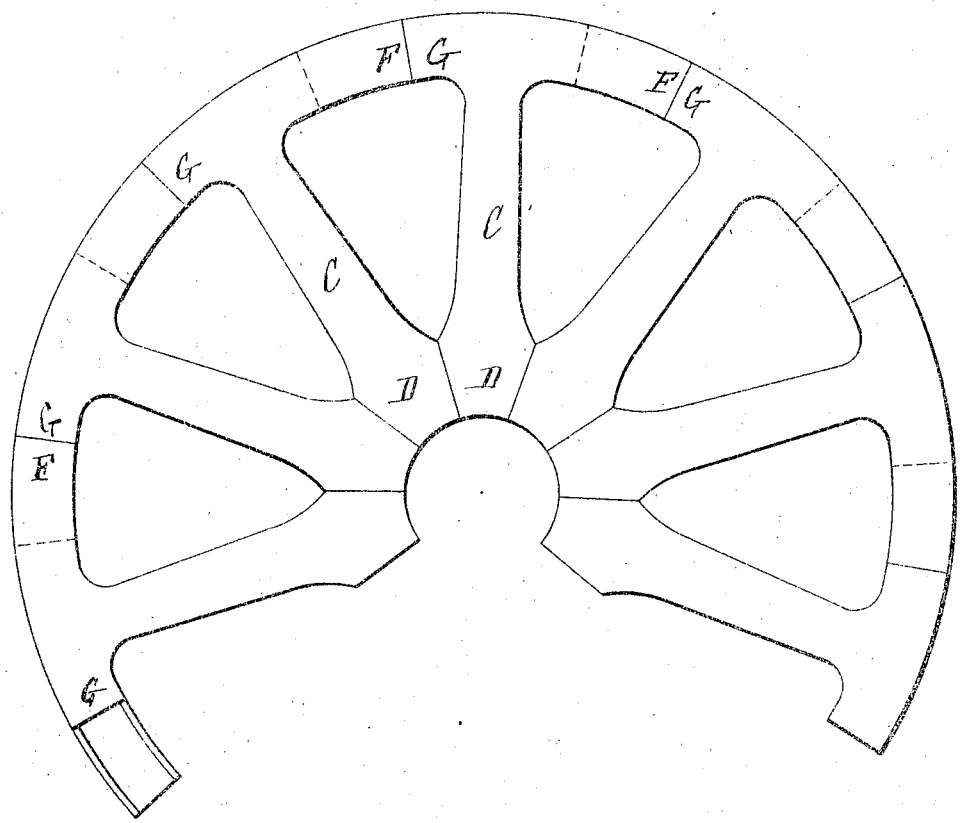

UNITED STATES PATENT OFFICE.

THOMAS E. MURRAY, OF NEW YORK, N. Y.

VEHICLE-WHEEL SECTION OF SHEET METAL.

1,316,382.   Specification of Letters Patent.   Patented Sept. 16, 1919.

Application filed March 28, 1918.  Serial No. 225,157.

*To all whom it may concern:*

Be it known that I, THOMAS E. MURRAY, a citizen of the United States, residing at New York, in the county of New York and State of New York, have invented a certain new and useful Improvement in Vehicle-Wheel Sections of Sheet Metal, of which the following is a specification.

The invention relates to hollow vehicle wheels of sheet metal, and consists in a structure entering into the construction of the wheel, struck up, stamped or pressed from sheet metal, and constituting an article of manufacture and sale—two of said structures being assembled to form a unit wheel section complete in itself, a plurality of which wheel sections may be assembled to form the complete wheel.

In the accompanying drawing—

Figure 1 shows in perspective one of the unit wheel sections composed of two half sections electrically welded together. Fig. 2 shows in perspective one of the half sections, with the fixed member of a tire clamp welded thereto. Fig. 3 shows in perspective and separately said fixed member of the tire clamp. Fig. 4 is a face view of a portion of the wheel showing the unit sections connected together.

Similar letters of reference indicate like parts.

A unit wheel section is shown in Fig. 1, and is composed of two half sections A and B. Each half section consists integrally of a spoke portion C, which at its inner end has a frusto-wedge shaped enlargement D, and at its outer end an arc-shaped portion E which forms part of the rim. The spoke portion C is united to the rim portion E at a point nearer to one end of said rim portion than to the opposite end, so that one arm F of said rim portion is longer than the other arm G. The half sections are produced by stamping, striking up or pressing sheet metal in suitable dies, so that all are exactly alike. They are assembled to form the wheel section with their edges in contact, and with the long arm F of the rim portion E of one half section overlapping the short arm G of the other rim section. The contacting edges of the half sections are to be united by electrical welding, so that practically the wheel section becomes integrally in one piece.

In forming a wheel, the sections are placed in juxtaposition, and the inclined sides H of the frusto-wedge shaped enlargements are electrically welded together, so that said enlargements unitedly form the wheel nave. The exposed edges of the rim portions E are similarly united to complete the rim. By reason of the overlapping of the arms F, G, the joints between successive wheel sections at the ends of said arms become staggered, so that each joint extends transversely across but one half of the cross sectional area of the rim, and so that each joint is, therefore, reinforced by the solid metal of the remaining half of said cross sectional area.

In order to secure the tire detachably upon the rim, I may use any suitable clamping device, which includes a rigidly fixed abutment member made concave to receive one side of the tire. Such an abutment is shown at I, Figs. 2 and 3, and is electrically welded to the outer side of the rim portion E of one of the half sections A or B. Said abutment is preferably placed symmetrically with respect to the longitudinal axis of the spoke C.

The half sections A, B are intended to constitute articles of manufacture, capable of production in any desired quantities, to be assembled into wheels by the user. So also the pair of half sections united to form a unit wheel section, as shown in Fig. 1, may constitute an article of manufacture—said sections being assembled, as before, by the user.

I claim:

1. As a new article of manufacture and entering into the construction of a hollow metal vehicle wheel, a wheel section comprising a spoke and an arc-shaped portion of the rim, the said spoke and rim portion being integrally formed in two longitudinal trough-shaped half sections electrically welded together edge to edge.

2. A vehicle wheel formed of a plurality of sections, as set forth in claim 1, the said rim portions being electrically welded together end to end.

3. A vehicle wheel formed of a plurality of sections, as in claim 2, the joints between the ends of the arc-shaped rim portions on one side of the wheel being staggered with the similar joints on the opposite side.

In testimony whereof I have affixed my signature in presence of two witnesses.

THOMAS E. MURRAY.

Witnesses:
 GERTRUDE T. PORTER,
 MAY T. MCGARRY.